United States Patent
Oikawa et al.

(10) Patent No.: US 8,175,432 B2
(45) Date of Patent: May 8, 2012

(54) METHOD OF ADJUSTING OPTICAL AXIS OF OPTICAL WAVEGUIDE ELEMENT, AND OPTICAL WAVEGUIDE ELEMENT

(75) Inventors: Satoshi Oikawa, Chiyoda-ku (JP); Toru Sugamata, Chiyoda-ku (JP); Ryo Shimizu, Chiyoda-ku (JP); Tsutomu Saitou, Chiyoda-ku (JP); Katsutoshi Kondou, Chiyoda-ku (JP)

(73) Assignee: Sumitomo Osaka Cement Co., Ltd., Tokyo (JP)

( * ) Notice: Subject to any disclaimer, the term of this patent is extended or adjusted under 35 U.S.C. 154(b) by 384 days.

(21) Appl. No.: 12/450,255

(22) PCT Filed: Mar. 19, 2008

(86) PCT No.: PCT/JP2008/055070
§ 371 (c)(1),
(2), (4) Date: Nov. 13, 2009

(87) PCT Pub. No.: WO2008/117713
PCT Pub. Date: Oct. 2, 2008

(65) Prior Publication Data
US 2010/0104241 A1      Apr. 29, 2010

(30) Foreign Application Priority Data
Mar. 27, 2007  (JP) .................................. 2007-082952

(51) Int. Cl.
*G02B 6/26* (2006.01)
(52) U.S. Cl. ........................................... 385/48; 385/45
(58) Field of Classification Search .................... 385/45, 385/48
See application file for complete search history.

(56) References Cited

U.S. PATENT DOCUMENTS

| 5,289,551 A | 2/1994 | Nakama et al. |
| 7,362,933 B2 | 4/2008 | Takahashi et al. |
| 2003/0133662 A1* | 7/2003 | Kim et al. ...................... 385/43 |

FOREIGN PATENT DOCUMENTS

| JP | 4-172308 A | 6/1992 |
| JP | 6-094936 A | 4/1994 |

(Continued)

*Primary Examiner* — Jerry Rahll
(74) *Attorney, Agent, or Firm* — Chapman and Cutler LLP (57) ABSTRACT

A method of adjusting the optical axis of an optical waveguide element which can improve a manufacturing yield of the optical waveguide element, an alignment yield between the optical waveguide element and an input waveguide means, etc. and can equalize the branch ratio in a Y-branch waveguide; and an optical waveguide element which can be made compact and also inhibited from complication in structure by using this method. The optical waveguide element (5) formed on a substrate comprises at least a linear waveguide (6) and a Y-branch waveguide (7) branched from the linear waveguide. The method of adjusting the optical axis of the optical waveguide element (5) when connecting the optical waveguide element (5) and an input waveguide means (3) for inputting a light wave into the optical waveguide element (5) is characterized in that a wide band light or two or more single-wavelength lights (light sources (1, 2)) having a different wavelength are inputted into the linear waveguide via the input waveguide means (3) and then the optical axes of the optical waveguide element (5) and input waveguide means (3) are so adjusted that light waves (10, 11) output from individual branch arms (8, 9) of the Y-branch waveguide may have nearly identical light intensity.

20 Claims, 5 Drawing Sheets

FOREIGN PATENT DOCUMENTS

| | | |
|---|---|---|
| JP | 2000-249867 A | 9/2000 |
| JP | 2001-083362 A | 3/2001 |
| JP | 2004-145171 A | 5/2004 |
| JP | 2004-258300 A | 9/2004 |
| JP | 2005-024914 A | 1/2005 |
| JP | 2005-181748 A | 7/2005 |
| JP | 2005-326657 A | 11/2005 |

* cited by examiner

METHOD OF ADJUSTING OPTICAL AXIS OF OPTICAL WAVEGUIDE ELEMENT, AND OPTICAL WAVEGUIDE ELEMENT

BACKGROUND OF THE INVENTION

1. Field of the Invention

The present invention relates to a method of adjusting an optical axis of an optical waveguide element, and an optical waveguide element. In particular, the present invention relates to a method of adjusting an optical axis of an optical waveguide element, which includes an optical waveguide having a Y-branch waveguide formed on a substrate, and to an optical waveguide element. Further, the present invention relates to a method of adjusting an optical axis of an optical waveguide element, which can be used in the field of optical communication or optical measurement, and has a splitter for splitting an input light beam into a plurality of light beams, and to an optical waveguide element.

2. Description of Related Art

In an optical waveguide element having an optical splitter, it is desirable that the light output intensity from the optical waveguide element be evenly split without depending on the wavelengths of light waves input to the optical waveguide element. However, in an actual optical waveguide element, a high-order mode light or a leaky mode light may be excited due to a manufacturing error, misalignment in the position and mode field shape of an incident fiber and an optical waveguide on an element side, or the like, and the branch ratio of the light output intensity in the branch unit may become out of equalization (one-to-one). If an optical modulator having a Mach-Zehnder type optical waveguide is formed with such a branch structure, the ON/OFF extinction ratio may be deteriorated.

Figure 7:
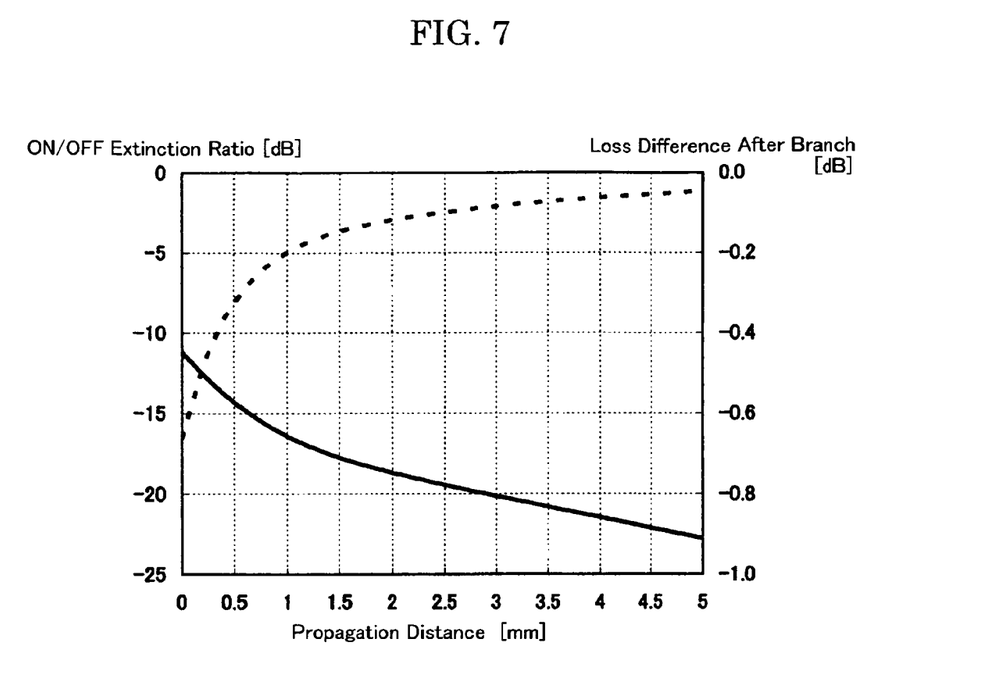
FIG. 7 is a graph showing changes in an ON/OFF extinction ratio (solid line) and a loss difference (dotted line) after branch with respect to a waveguide length (propagation distance) to the branch.

In the connectional optical waveguide elements, usually, the waveguide length is increased in order to equalize the branch ratio of light to the branch. The increase in the waveguide length enables the light waves, such as high-order mode light or the like, which has an effect on the branch ratio, to be emitted outside the waveguide before reaching the splitter. As shown in FIG. 7, if the waveguide length (propagation distance) to the branch is longer than 3 mm, the ON/OFF extinction ratio (solid line) can be kept around −20 dB, and the loss difference (dotted line) after the branch can be kept around −0.1 dB.

In addition, as described in Patent Documents 1 to 3, the shape of the optical waveguide has been studied, and the tests for equalizing the branch ratio of light have been performed.

Patent Document 1 discloses a configuration in which a low equivalent refractive index waveguide is provided in an optical waveguide portion ahead of a Y-branch waveguide. With this low equivalent refractive index waveguide, high-order mode light or leaky mode light is radiated from the optical waveguide into the substrate, and only base mode light is propagated, so adjustment is made such that the branch ratio of the light intensity is equalized.

Patent Document 1: Japanese Unexamined Patent Application Publication No. 4-172308

According to the method described in Patent Document 1, the low equivalent refractive index waveguide is provided ahead of the splitter. For this reason, it is necessary to increase the waveguide length before the splitter, which makes it difficult to reduce the size of the entire optical waveguide element.

Patent Document 2 defines the sectional shape and the length of an optical waveguide or a branch waveguide between an incident waveguide and a splitter, thereby suppressing the wavelength dependency of the branch ratio and achieving equalization.

Patent Document 2: Japanese Unexamined Patent Application Publication No. 2005-326657

According to the method described in Patent Document 2, if a three-dimensional waveguide, such as PLC (Planar Lightwave Circuit) or the like, is used, the optical waveguide can be processed in a specific sectional shape. However, in the case of a so-called diffusion type waveguide, in which an optical waveguide is formed by thermally diffusing a diffusion material, such as Ti or the like, on a substrate made of lithium niobate, it is difficult to process the optical waveguide in a specific sectional shape.

Patent Document 3 discloses the configuration in which a branched optical waveguide for removing high-order mode light is disposed in an optical waveguide ahead of a splitter.

Patent Document 3: Japanese Unexamined Patent Application Publication No. 2005-181748

According to the method described in Patent Document 3, a general optical waveguide needs to be added to provide an optical waveguide for removing high-order mode light, which leads to deterioration in the manufacturing yield of the optical waveguide element.

Other than the methods of adjusting the shape of the optical waveguide, the optical axes of the optical waveguide element and the input waveguide means are adjusted (referred to as "alignment") while measuring the light intensity of a light wave emitted from the branch waveguide, or observing the change in the light intensity of the light wave emitted from the Mach-Zehnder type optical waveguide or the output light intensity characteristic (referred to as "modulation characteristic") from the optical waveguide with respect to means (for example, in the case of a substrate having an electro-optical effect, voltage) for changing the refractive index applied to the optical waveguide (or the phase of light) as a Lissajous waveform by using an oscilloscope, thereby suppressing a shift in the branch ratio.

However, in the alignment method according to the related art, the alignment is made by a single light source, such as a semiconductor laser or the like, having a specific single wavelength. Accordingly, in the case of a specific wavelength, even if the branch ratio is set suitably, when the wavelength to be used changes or when the state of the optical waveguide element changes due to the change in temperature or the like, a shift in the branch ratio occurs, which leads to deterioration in the manufacturing yield concerning the alignment of the optical waveguide element and the input waveguide means.

Meanwhile, in the method of evaluating the characteristic of the optical waveguide element to be manufactured, it is important to determine whether or not the characteristic of the Y-branch waveguide in the optical waveguide element, especially, the branch ratio is suitable. With the method of evaluating the characteristic of the optical waveguide element, similarly to the above-described optical axis adjustment method, a single light source, such as a semiconductor laser or the like, having a specific single wavelength is used in order to evaluate the characteristic of the Y-branch waveguide. In the case of a specific wavelength, even if the branch ratio is evaluated to be suitable, when the wavelength to be used changes or when the state of the optical waveguide element changes due to the change in temperature or the like, a shift in the branch ratio may occur. For this reason, it is necessary to evaluate the characteristic with respect to an input light wavelength or temperature, and simple evaluation is demanded.

SUMMARY OF THE INVENTION

In order to solve the above-described problems, it is desirable to provide a method of adjusting an optical axis of an optical waveguide element which can improve the manufacturing yield of the optical waveguide element or alignment yield between the optical waveguide element and input waveguide means, and can equalize the branch ratio in a Y-branch waveguide, and an optical waveguide element which can be made compact and kept simple in structure.

A first aspect of the invention provided a method of adjusting an optical axis of an optical waveguide element when connecting input waveguide means to the optical waveguide element, the optical waveguide element having an optical waveguide formed on a substrate, the optical waveguide having at least a straight waveguide and a Y-branch waveguide branched from the straight waveguide, and the input waveguide means inputting a light wave to the optical waveguide element. The method includes the steps of inputting a wide band wavelength light beam or two or more single-wavelength light beams having different wavelengths to the straight waveguide through the input waveguide means, and adjusting the optical axes of the optical waveguide element and the input waveguide means such that light waves output from respective branch arms of the Y-branch waveguide have substantially identical light intensity.

The term "substantially identical" used herein is a concept including a branch ratio, which shows effects comparable with a case where the branch ratio is in one-to-one correspondence, as the effects to be expected in the fields where the optical waveguide element is used, as well as the case where the branch ratio is in one-to-one correspondence.

A second aspect of the invention provided a method of adjusting an optical axis of an optical waveguide element when connecting input waveguide means to the optical waveguide element, the optical waveguide element having an optical waveguide formed on a substrate, the optical waveguide having at least a straight waveguide and a Y-branch waveguide branched from the straight waveguide, and the input waveguide means inputting a light wave to the optical waveguide element. The method includes the steps of inputting a wide band wavelength light beam or two or more single-wavelength light beams having different wavelengths to the straight waveguide through the input waveguide means, and multiplexing light waves output from respective branch arms of the Y-branch waveguide and measuring at least one of the light intensity and Lissajous characteristics (modulation characteristics) of a light wave after the multiplexing so as to adjust the optical axes of the optical waveguide element and the input waveguide means.

The term "multiplexing of light waves" used herein is a concept including a case where Y-branch waveguides formed on different substrates are connected to each other, or a case where multiplexing is made by using a waveguide unit, such as an optical fiber or the like, outside the substrate on which the Y-branch waveguide is formed, as well as a case where multiplexing is realized by an optical waveguide which is formed on the substrate on which the splitter is formed.

According to a third aspect of the invention, in the method according to the second aspect of the invention, the optical waveguide may be a Mach-Zehnder type optical waveguide which is formed on the substrate at least from the Y-branch waveguide to a multiplexer for multiplexing the light waves output from the respective branch arms.

According to a fourth aspect of the invention, in the method according to the second aspect of the invention, the optical waveguide may be a nested optical waveguide which is formed on the substrate at least from the Y-branch waveguide to a multiplexer for multiplexing the light waves output from the respective branch arms.

According to a fifth aspect of the invention, in the method according to any one of the second to fourth aspects of the invention, the optical axes of the optical waveguide element and the input waveguide means may be adjusted such that a variation in the ON/OFF extinction ratio of the light wave after the multiplexing is within 10 dB.

According to a sixth aspect of the invention, in the method according to any one of the first to fifth aspects of the invention, the length of the straight waveguide may be equal to or smaller than 2000 times the wavelength of a light wave to be guided, or equal to or smaller than 3 mm.

A seventh aspect of the invention provides an optical waveguide element. The optical waveguide element includes an optical waveguide formed on a substrate, the optical waveguide having at least a straight waveguide and a Y-branch waveguide branched from the straight waveguide. Input waveguide means for inputting a light wave is connected to the optical waveguide element. When a wide band wavelength light beam or two or more single-wavelength light beams having different wavelengths are input to the straight waveguide through the input waveguide means, the optical axes of the optical waveguide element and the input waveguide means are adjusted such that light waves output from respective branch arms of the Y-branch waveguide have substantially identical light intensity, and the length of the straight waveguide is equal to or smaller than 2000 times the wavelength of a light wave to be guided, or equal to or smaller than 3 mm.

An eighth aspect of the invention provides an optical waveguide element. The optical waveguide element includes an optical waveguide formed on a substrate, the optical waveguide having at least a straight waveguide and a Y-branch waveguide branched from the straight waveguide. Input waveguide means for inputting a light wave is connected to the optical waveguide element. When a wide band wavelength light beam or two or more single-wavelength light beams having different wavelengths are input to the straight waveguide through the input waveguide means, light waves output from respective branch arms of the Y-branch waveguide are multiplexed and at least one of the light intensity and modulation characteristics of a light wave after the multiplexing is measured so as to adjust the optical axes of the optical waveguide element and the input waveguide means, and the length of the straight waveguide is equal to or smaller than 2000 times the wavelength of a light wave to be guided, or equal to or smaller than 3 mm.

According to a ninth aspect of the invention, in the optical waveguide element according to the eighth aspect of the invention, the optical waveguide may be a Mach-Zehnder type optical waveguide which is formed on the substrate at least from the Y-branch waveguide to a multiplexer for multiplexing the light waves output from the respective branch arms.

According to a tenth aspect of the invention, in the optical waveguide element according to the eighth aspect of the invention, the optical waveguide may be a nested optical waveguide which is formed on the substrate at least from the Y-branch waveguide to a multiplexer for multiplexing the light waves output from the respective branch arms.

According to an eleventh aspect of the invention, in the optical waveguide element according to any one of the eighth to tenth aspects of the invention, the optical axes of the optical waveguide element and the input waveguide means may be adjusted such that a variation in the ON/OFF extinction ratio of the light wave after the multiplexing is within 10 dB.

According to a twelfth aspect of the invention, in the optical waveguide element according to the eleventh aspect of the invention, the optical axes of the optical waveguide element and the input waveguide means may be adjusted such that the variation in the ON/OFF extinction ratio of light waves is within 10 dB in the wavelength range of one of an O band, an E band, an S band, a C band, and an L band, or a combination of them.

With the first aspect of the invention, there is provided the method of adjusting an optical axis of an optical waveguide element when connecting the input waveguide means to the optical waveguide element, the optical waveguide element has the optical waveguide formed on the substrate, the optical waveguide having at least the straight waveguide and the Y-branch waveguide branched from the straight waveguide, and the input waveguide means inputting a light wave. The method includes the steps of inputting a wide band wavelength light beam or two or more single-wavelength light beams having different wavelengths to the straight waveguide through the input waveguide means, and adjusting the optical axes of the optical waveguide element and the input waveguide means such that light waves output from respective branch arms of the Y-branch waveguide have substantially identical light intensity. Thus, a method of adjusting an optical axis of an optical waveguide element can be provided which can equalize the branch ratio in the Y-branch waveguide. In particular, a wide band wavelength light beam or two or more single-wavelength light beams having different wavelengths are used, so the branch ratio of the light intensity in the splitter can be equalized in a wide wavelength range. Further, no special structure is needed for the straight waveguide, so the entire optical waveguide element can be reduced in size.

With the second aspect of the invention, there is provided the method of adjusting an optical axis of an optical waveguide element when connecting the input waveguide means to the optical waveguide element, the optical waveguide element has the optical waveguide formed on the substrate, the optical waveguide having at least the straight waveguide and the Y-branch waveguide branched from the straight waveguide, and the input waveguide means inputting a light wave. The method includes the steps of inputting a wide band wavelength light beam or two or more single-wavelength light beams having different wavelengths to the straight waveguide through the input waveguide means, and multiplexing light waves output from the respective branch arms of the Y-branch waveguide and measuring at least one of the light intensity and Lissajous characteristics (modulation characteristics) of a light wave after the multiplexing so as to adjust the optical axes of the optical waveguide element and the input waveguide means. Thus, a method of adjusting an optical axis of an optical waveguide element can be provided which can equalize the branch ratio in the Y-branch waveguide. Further, no special structure is needed for the straight waveguide, so the entire optical waveguide element can be reduced in size. In addition, in the case of a Mach-Zehnder type optical waveguide in which a Y-branch waveguide and a multiplexer of a light wave are formed on the substrate together, the branch ratio can be equalized, and when an optical waveguide element is used as a light intensity modulator, an optical modulator having a high ON/OFF extinction ratio can be provided.

With the third aspect of the invention, the optical waveguide is the Mach-Zehnder type optical waveguide which is formed on the substrate at least from the Y-branch waveguide to the multiplexer for multiplexing the light waves output from the respective branch arms. Thus, the entire optical waveguide element which has a Mach-Zehnder type optical waveguide can be reduced in size, and the optical waveguide element can be provided as an optical modulator having a high ON/OFF extinction ratio.

With the fourth aspect of the invention, the optical waveguide is the nested optical waveguide which is formed on the substrate at least from the Y-branch waveguide to the multiplexer for multiplexing the light waves output from the respective branch arms. Thus, the entire optical waveguide element which has a nested optical waveguide can be reduced in size, and an optical waveguide element having an excellent modulation characteristic can be provided.

With the fifth aspect of the invention, the optical axes of the optical waveguide element and the input waveguide means are adjusted such that the variation in the ON/OFF extinction ratio of the light wave after the multiplexing is within 10 dB. Thus, when an optical waveguide element is used as a light intensity modulator, the ON/OFF extinction ratio can be further increased, and an optical waveguide element having an excellent modulation characteristic can be provided.

With the sixth aspect of the invention, the length of the straight waveguide is equal to or smaller than 2000 times the wavelength of a light wave to be guided, or equal to or smaller than 3 mm. Thus, the entire optical waveguide element can be further reduced in size.

With the seventh aspect of the invention, the optical waveguide element includes the optical waveguide formed on the substrate, the optical waveguide having at least the straight waveguide and the Y-branch waveguide branched from the straight waveguide. The input waveguide means for inputting a light wave is connected to the optical waveguide element. When a wide band wavelength light beam or two or more single-wavelength light beams having different wavelengths are input to the straight waveguide through the input waveguide means, the optical axes of the optical waveguide element and the input waveguide means are adjusted such that light waves output from the respective branch arms of the Y-branch waveguide have substantially identical light intensity, and the length of the straight waveguide is equal to or smaller than 2000 times the wavelength of a light wave to be guided, or equal to or smaller than 3 mm. Thus, the branch ratio in the Y-branch waveguide can be equalized, and a compact optical waveguide element can be provided.

With the eighth aspect of the invention, the optical waveguide element includes the optical waveguide formed on the substrate, the optical waveguide having at least the straight waveguide and the Y-branch waveguide branched from the straight waveguide. The input waveguide means for inputting a light wave is connected to the optical waveguide element. When a wide band wavelength light beam or two or more single-wavelength light beams having different wavelengths are input to the straight waveguide through the input waveguide means, light waves output from the respective branch arms of the Y-branch waveguide are multiplexed and at least one of the light intensity and modulation characteristics of a light wave after the multiplexing is measured so as to adjust the optical axes of the optical waveguide element and the input waveguide means, and the length of the straight waveguide is equal to or smaller than 2000 times the wavelength of a light wave to be guided, or equal to or smaller than 3 mm. Thus, when an optical waveguide element is used as a light intensity modulator, an optical waveguide element which has a high ON/OFF extinction ratio and is made compact can be provided.

With the ninth aspect of the invention, the optical waveguide is the Mach-Zehnder type optical waveguide which is formed on the substrate at least from the Y-branch waveguide to the multiplexer for multiplexing the light waves output from the respective branch arms. Thus, the entire optical waveguide element which has a Mach-Zehnder type optical waveguide can be reduced in size, and the optical waveguide element can be provided as an optical modulator having a high ON/OFF extinction ratio.

With the tenth aspect of the invention, the optical waveguide is the nested optical waveguide which is formed on the substrate at least from the Y-branch waveguide to the multiplexer for multiplexing the light waves output from the respective branch arms. Thus, the entire optical waveguide element which has a nested optical waveguide can be reduced in size, and an optical waveguide element having an excellent modulation characteristic can be provided.

With the eleventh aspect of the invention, the optical axes of the optical waveguide element and the input waveguide means are adjusted such that the variation in the ON/OFF extinction ratio of the light wave after the multiplexing is within 10 dB. Thus, when an optical waveguide element is used as a light intensity modulator, the ON/OFF extinction ratio can be further increased, and an optical waveguide element having an excellent modulation characteristic can be provided.

According to the twelfth aspect of the invention, the optical axes of the optical waveguide element and the input waveguide means are adjusted such that the variation in the ON/OFF extinction ratio of light waves is within 10 dB in the wavelength range of one of the O band, the E band, the S band, the C band, and the L band, or the combination of them. Thus, an optical waveguide element having a high ON/OFF extinction ratio can be provided for a band in which an optical waveguide element is used, or a wider band.

DETAILED DESCRIPTION OF THE INVENTION

Embodiments of a method of adjusting an optical axis of an optical waveguide element and an optical waveguide element according to the invention will be described.

Figure 1:
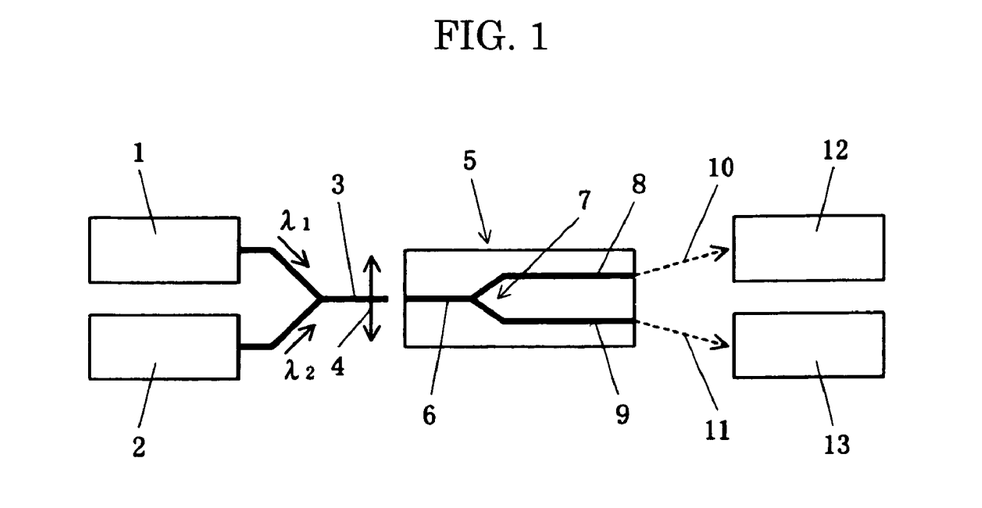
FIG. 1 is a schematic view showing a first embodiment of the invention.

FIG. 1 schematically shows a first embodiment of a method of adjusting an optical axis of an optical waveguide element according to the invention.

Referring to FIG. 1, there is provided a method of adjusting an optical axis when connecting input waveguide means 3 to an optical waveguide element 5, the optical waveguide element 5 having an optical waveguide formed on a substrate, the optical waveguide having at least a straight waveguide 6 and a Y-branch waveguide 7 branched from the straight waveguide, and the input waveguide means 3 inputs a light wave to the optical waveguide element 5. The method includes the steps of inputting two or more single-wavelength light beams ($\lambda 1$ and $\lambda 2$) having different wavelengths to the straight waveguide 6 through the input waveguide means 3, and adjusting the optical axes of the optical waveguide element 5 and the input waveguide means 3 such that light waves 10 and 11 output from respective branch arms 8 and 9 of the Y-branch waveguide 7 have substantially identical light intensity.

The term "input waveguide means" used herein means for guiding light waves focused on the optical waveguide element by using an optical component, such as a lens or the like, as well as an optical fiber. Hereinafter, description will be made focusing on an example where an optical fiber is used.

Herein, two or more single-wavelength light beams ($\lambda 1$ and $\lambda 2$) having different wavelengths, or a wide band wavelength light beam is used herein, so the term "light intensity" is used when the light intensity of the entire light wave to which light beams with multiple wavelengths are coupled is detected, and is also used when the light intensities with the respective wavelengths or a plurality of specific wavelengths are measured and compared with each other.

In FIG. 1, semiconductor lasers or light-emitting diodes which generate light waves with wavelengths $\lambda 1$ and $\lambda 2$ are used as light sources 1 and 2 with different wavelengths. Light waves which are emitted from the two light sources 1 and 2 need to be multiplexed and emitted from the input waveguide means 3. For this reason, as shown in FIG. 1, multiplexing means, such as an optical coupler or the like, is provided, or an optical component, such as a lens or a mirror, is used for optical coupling.

The two multiplexed light waves are coupled and input to the straight waveguide 6 of the optical waveguide element 5. The Y-branch waveguide 7 is disposed at the end portion of the straight waveguide 6. The light wave which is propagated through the straight waveguide 6 is split into two light waves by the Y-branch waveguide 7, and the two light waves propagate the branch arms 8 and 9 and are emitted outside the optical waveguide element 5.

With regard to the light waves 10 and 11 emitted to the outside, the light intensities of the outgoing light beams 10 and 11 are detected by light intensity monitors (for example, PDs or power meters) 12 and 13.

Next, the procedure of the method of adjusting an optical axis will be described.

(1) Preparation of Light Waves which are Input to Optical Waveguide Element

The light sources 1 and 2 are driven to emit light waves having two different wavelengths from the input waveguide means 3.

(2) Introduction of Light Waves of (1) to Straight Wave Guide and Position Adjustment (Alignment)

The input waveguide means 3 is disposed at the end portion of the straight waveguide 6, and the position of the input waveguide means 3 is moved as indicated by an arrow 4 while observing the light intensities of light waves emitted from the respective branch arms on the light intensity monitors 12 and 13.

(3) Decision of Optical Axis Position

It is determined that the position of the input waveguide means 3 with respect to the optical waveguide element where the light intensities on the light intensity monitors 12 and 13 are identical is the optimum position, and optical axis adjustment is completed. After the optical axis adjustment, if needed, the optical component itself or a support member thereof is fixed to a hosing by welding, soldering, or an adhesive.

In FIG. 1, the number of light sources is not limited to two, and the wavelengths of the light sources are desirably set to adjacent wavelengths, or separate wavelengths, for example, an upper limit wavelength and a lower limit wavelength in the wavelength range which is expected to be used.

The light intensities of the respective light sources are desirably set to be substantially identical. With regard to the polarized waves of the light sources, when the optical waveguide element subject to alignment has polarized wave dependency, the polarized waves of the light sources are desirably input after being adjusted.

As described above, since the optical axis adjustment is made by using light waves having two or more different wavelengths, the branch ratio of the light intensity in the splitter can be equalized in a wide wavelength range. Further, since the branch ratio of the Y-branch waveguide is adjusted by the optical axis adjustment, no special structure is needed for the straight waveguide 6. Thus, it is confirmed that even if the length of the straight waveguide 6 is set to be equal to or smaller than 3 mm, or equal to or smaller than 2000 times the wavelength of a light wave to be used, a suitable branch ratio is ensured. Therefore, the entire optical waveguide element can be reduced in size.

Next, a second embodiment of the method of adjusting an optical axis of an optical waveguide element according to the invention will be described with reference to FIG. 2.

A second embodiment provides a method of adjusting an optical axis of an optical waveguide element when connecting input waveguide means 21 to an optical waveguide element 23. The optical waveguide element 23 has an optical waveguide formed on a substrate, the optical waveguide having at least a straight waveguide 24 and a Y-branch waveguide 25 branched from the straight waveguide 24. The method includes the steps of inputting a wide band wavelength light beam (light source 20) to the straight waveguide 24 through the input waveguide means 21, and multiplexing light waves output from respective branch arms 26 and 27 of the Y-branch waveguide 25 (multiplexer 28) and measuring at least one of the light intensity and Lissajous characteristics (modulation characteristics) of a light wave 29 after multiplexing so as to adjust the optical axes of the optical waveguide element 23 and the input waveguide means 21. Thus, the branch ratio in the Y-branch waveguide 25 can be equalized.

Figure 2:
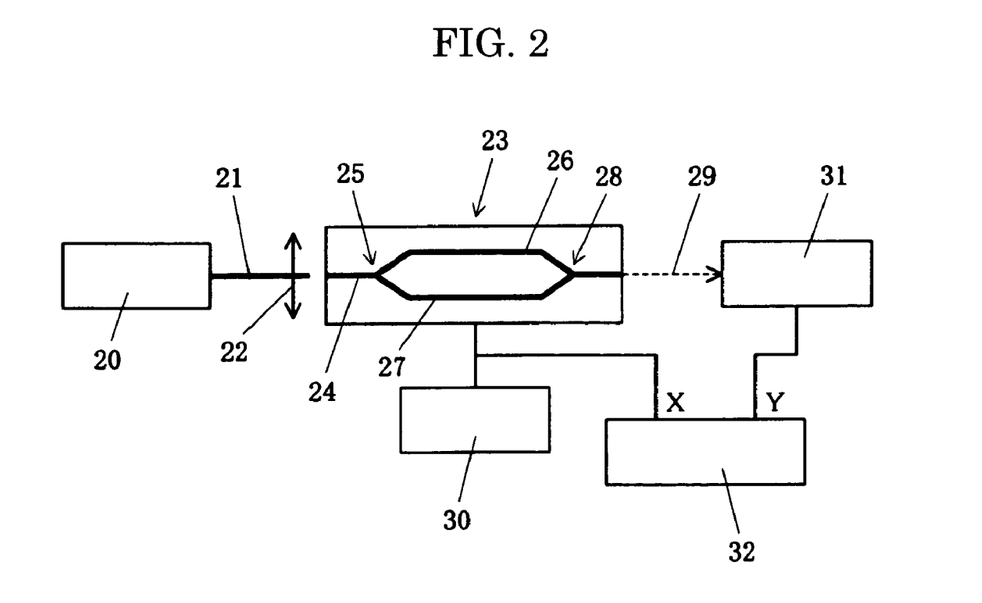
FIG. 2 is a schematic view showing a second embodiment of the invention.

FIG. 2 illustrates a Mach-Zehnder interferometer type waveguide element, which is manufactured by diffusing Ti or the like on a $LiNbO_3$ substrate having an electro-optical effect, as an optical waveguide element. The optical axis adjustment can be made in the same manner as the second embodiment for a case where the optical waveguide elements 5 each having a single Y-branch waveguide shown in FIG. 1 formed on different substrates are connected to each other, or a case where waveguide means (not shown), such as an optical coupler or the like, for multiplexing light waves emitted from the branch arms 8 and 9 is connected outside a substrate on which a Y-branch waveguide is formed, as well as a case where an optical waveguide element which has a Mach-Zehnder type optical waveguide formed on the same substrate.

Although the basic procedure of the method of adjusting an optical axis is the same as the first embodiment, the feature of the second embodiment resides in that a wide band wavelength light source, such as a white light source, for example, an SLD (Super Luminescent Diode) light source having a wide band wavelength range is used as the light source 20.

Referring to FIG. 2, a photodetector 31 receives the light wave 29 which is emitted from the optical waveguide element 23, and a signal from the photodetector 31 and a signal from an oscillator 30 for driving the optical waveguide element 23 are input to the Y-axis terminal and the X-axis terminal of an oscilloscope 32, respectively. Then, an incident fiber 21 serving as input waveguide means is moved in the direction of an arrow 22 or the like while viewing a modulation curve on the oscilloscope 32, and alignment is performed.

As described above, the optical axis adjustment may be made while measuring the light intensity of the light wave 29 by using the photodetector 31 and observing the change in the intensity, as well as observing the Lissajous characteristic by using the oscilloscope.

With regard to the light intensity, when the wide band wavelength light beam is used, the light intensity of the entire light wave including light beams with a plurality of wavelengths may be detected, but the invention is not limited thereto. For example, focusing on a plurality of specific wavelengths, the light intensities of the respective wavelengths may be detected. Further, the same may be applied to a case where two or more single-wavelength light beams, instead of the broad band light beam, are used, as described below.

In the measurement of the light intensity, it is desirable that the intensity of the light wave is measured, and the optical axis is adjusted such that the extinction ratio is maximized.

A case where the optical axis is adjusted by the Lissajous characteristic will be described.

Figure 3:
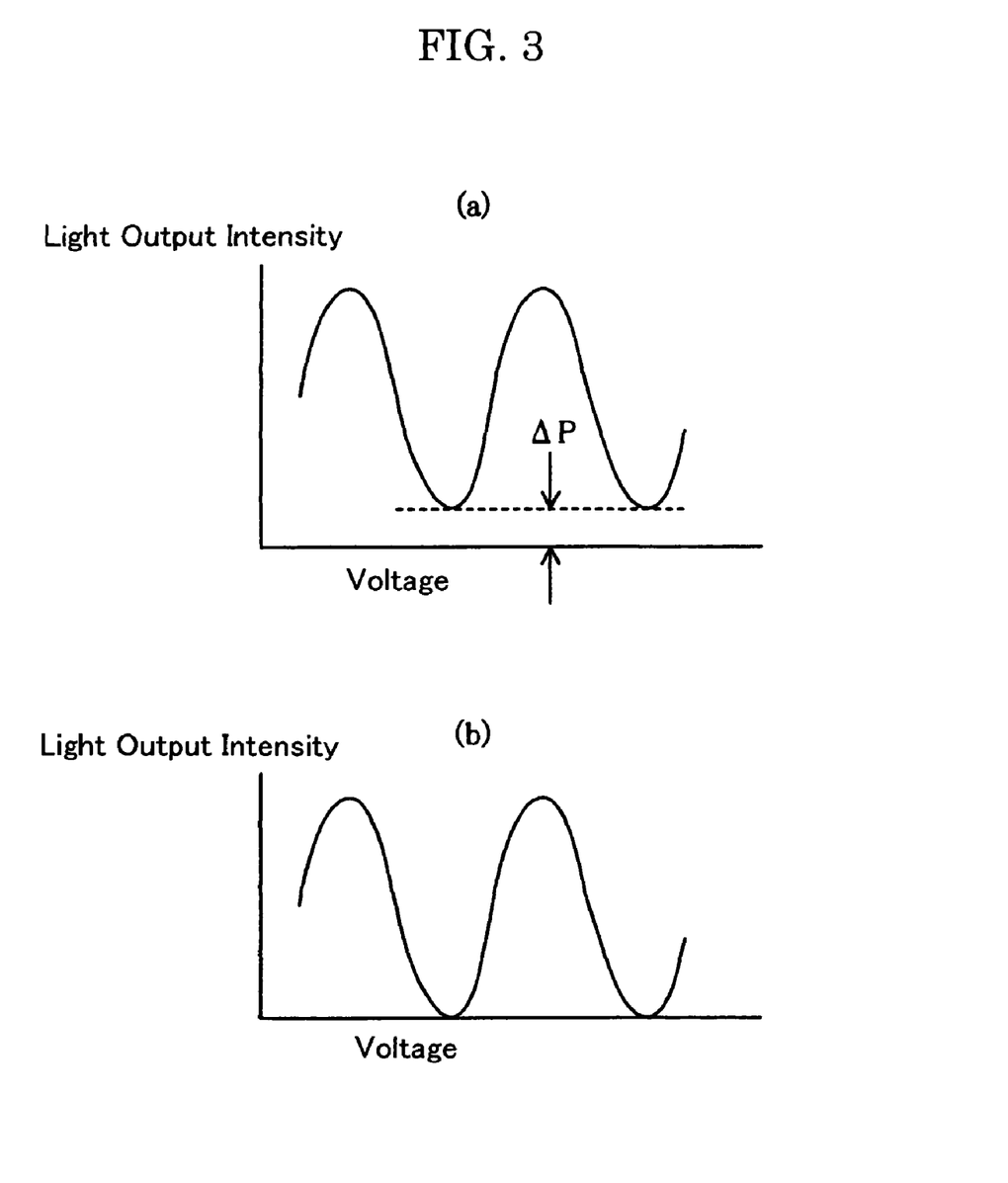
FIG. 3 is a diagram showing an example of a modulation curve in the second embodiment.

FIG. 3 shows an example of a modulation curve measured by an oscilloscope. FIG. 3(a) shows a state where the branch ratio of the Y-branch waveguide 25 is out of one-to-one correspondence. In this case, usually, the minimum value $\Delta P$ of the light output intensity in the modulation curve does not become 0. With regard to the ideal value when the branch ratio is in one-to-one correspondence, as shown in FIG. 3(b), the minimum value of the light output intensity in the modulation curve becomes 0.

Meanwhile, a light wave which is input to the optical waveguide element is emitted from the wide band wavelength light source, so even if the minimum value of the light output intensity of the multiplexed light wave with a specific wavelength becomes 0, the minimum value with a different wavelength at the same voltage is not limited to 0. Actually, while several minimum values $\Delta P$ of the multiplexed light wave can be measured with respect to a voltage within a measurement range, all the values of $\Delta P$ are not 0. For this reason, optical axis adjustment is desirably performed in a situation where the number of points at which a plurality of the minimum value $\Delta P$ can be measured with respect to the voltage within the measurement range is minimized (the sum of a plurality of values $\Delta P$ is minimized).

Like the second embodiment, even in the case of the optical waveguide element or the like having a Mach-Zehnder type optical waveguide, which is formed by Ti thermal diffusion, the optical axis adjustment of the input waveguide means 21 enables the equalization of the branch ratio of the Y-branch waveguide 25. Thus, no special structure is needed for the straight waveguide 24, and similarly to the first embodiment, the entire optical waveguide element can be reduced in size. In the case of a Mach-Zehnder type optical waveguide, the branch ratio can be equalized, so when an optical waveguide element is used as a light intensity modulator, an optical modulator having a high ON/OFF extinction ratio can be provided.

Figure 4:
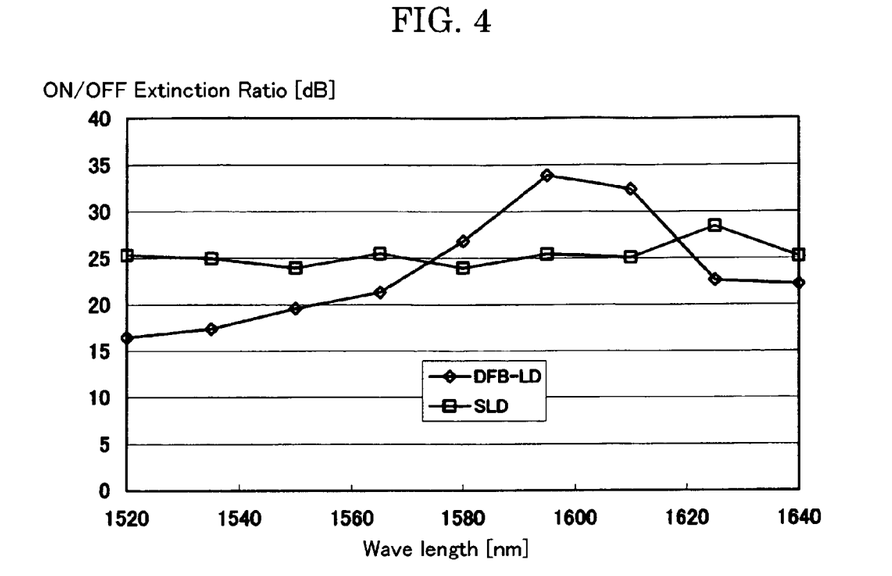
FIG. 4 is a graph showing wavelength dependency of an ON/OFF extinction ratio which is measured in the second embodiment.

FIG. 4 shows the measurement result of wavelength characteristics in an alignment state when an optical element which has a Mach-Zehnder type waveguide formed on an X-cut LiNbO₃ substrate is aligned by using a DFB-LD and an SLD light source. The horizontal axis represents the wavelength of a light wave input for measurement, and the vertical axis represents the value of the ON/OFF extinction ratio of each wavelength. Referring to FIG. 4, when alignment is made by using the DFB-LD, a good extinction ratio is obtained around a specific wavelength (for example, 1600 nm), but the characteristic is deteriorated when deviated from the specific wavelength. Meanwhile, when alignment is made by using the SLD light source, it is understood that a substantially constant characteristic (the change in the ON/OFF extinction ratio is equal to or less than 10 dB) is observed in a wide wavelength range.

In the above-described optical axis adjustment, an example where two or more different single-wavelength light beams, or a wide band wavelength light beam is used has been described, light waves to be used are not limited to these light waves. For example, optical axis adjustment may be performed by using light waves in a band to be used, for example, the wavelength band standardized by the International Telecommunication Union (ITU-T), such as the O band (Original-band: 1260 to 1360 nm), the E band (Extended-band: 1360 to 1460 nm), the S band (Short-band: 1460 to 1530 nm), the C band (Conventional-band: 1530 to 1565 nm), the L band (Long-band: 1565 to 1625 nm), or the like. If needed, a combination of the light wave bands may be used, or a specific range in one band may be used. Thus, in a light wave band to be actually used, the branch ratio in the Y-branch waveguide can be equalized, or the variation in the ON/OFF extinction ratio can be made equal to or less than 10 dB.

Figure 5:
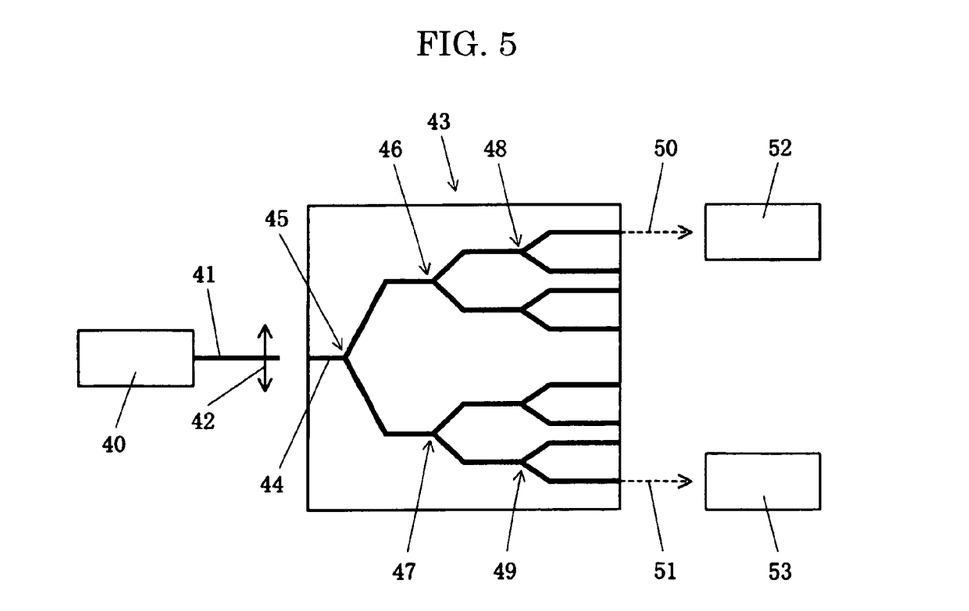
FIG. 5 is a schematic view showing an embodiment in which an optical waveguide element having a plurality of branch waveguides is used.

FIG. 5 shows an example where optical axis adjustment is performed on an optical waveguide element 43 having an optical waveguide branched into a plurality of waveguide paths. The basic method of adjusting an optical axis is the same as in the first and second embodiments.

In FIG. 5, an SLD light source which is used in the second embodiment is used as a light source 40. For a measurement portion, the light intensity monitors 52 and 53 which are used in the first embodiment are used. The number of light intensity monitors is not limited to two, but it is necessary to specify branch arms for optical axis adjustment which are branched symmetrically from the Y-branch waveguide, and compare the light intensities of light waves 50 and 51, which are emitted from the specified branch arms, with each other.

In FIG. 5, the optical axis adjustment of input waveguide means 41 (for example, position adjustment in the direction of an arrow 42) is performed focusing on a Y-branch waveguide 45, but optical axis adjustment may be performed focusing on other Y-branch waveguides (for example, reference numerals 46 to 49).

Figure 6:
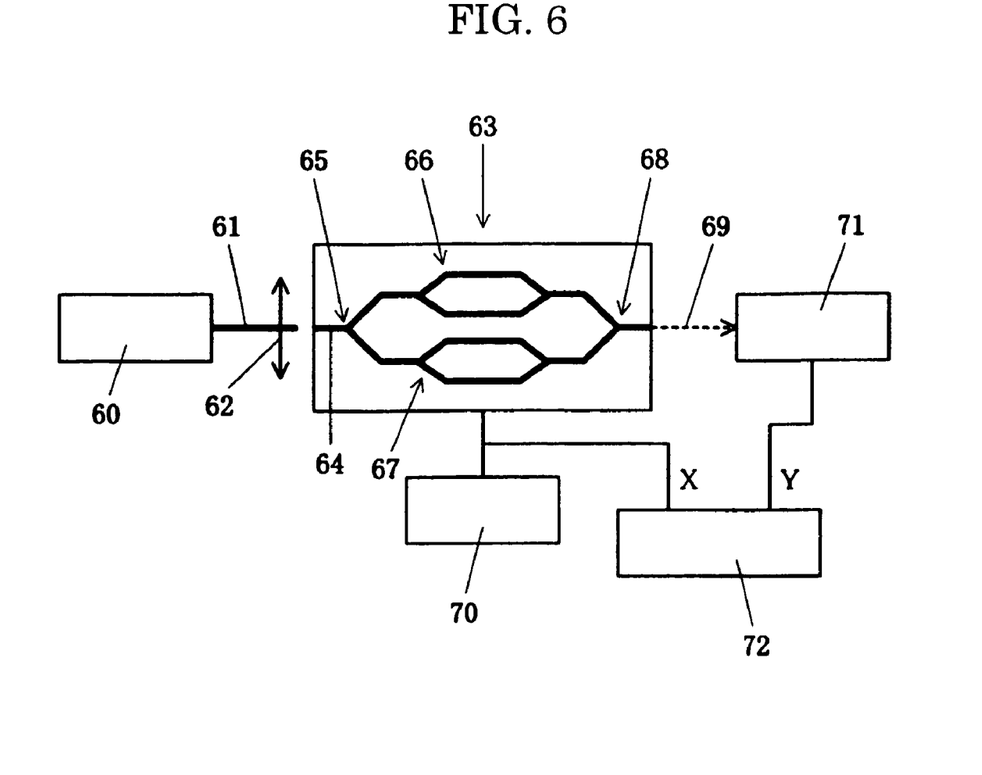
FIG. 6 is a schematic view showing an embodiment in which an optical waveguide element having a nested waveguide is used.

FIG. 6 shows an example where optical axis adjustment is performed on an optical waveguide element 63 having a nested optical waveguide. The basic method of adjusting an optical axis is the same as in the second embodiment. As the light sources, similarly to the first embodiment, two or more different single-wavelength light beams may be used.

A nested optical waveguide includes a main Mach-Zehnder type waveguide which has a straight waveguide 64 and a Y-branch waveguide 65, and sub Mach-Zehnder type waveguides 66 and 67 which are incorporated into respective branch arms of the main Mach-Zehnder type waveguide.

Similarly to the second embodiment, the straight waveguide 64 inputs a wide band wavelength light beam (light source 60) through input waveguide means 61, light waves output from the sub Mach-Zehnder type waveguides 66 and 67 provided at the respective branch arms of the Y-branch waveguide 65 are multiplexed (multiplexer 68), and at least one of the light intensity and Lissajous characteristics (modulation characteristics) of a light wave 69 after multiplexing is measured, thereby adjusting the optical axes of the optical waveguide element 63 and the input waveguide means 61. Therefore, a method of adjusting an optical axis of an optical waveguide element can be provided which can equalize the branch ratio in the Y-branch waveguide 65.

In FIG. 6, a photodetector 71 receives the light wave 69 emitted from the optical waveguide element 63, and a signal from the photodetector 71 and a signal from an oscillator 70 for driving the optical waveguide element 63 are input to the Y-axis terminal and the X-axis terminal of an oscilloscope 72, respectively. Then, an input optical fiber 61 serving as input waveguide means is moved in the direction of an arrow 62 while viewing the modulation curve on the oscilloscope 72, and alignment is performed.

The invention provides the method of adjusting an optical axis of an optical waveguide element, and also an optical waveguide element which is manufactured by the method of adjusting an optical axis. With an optical waveguide element according to an embodiment of the invention, the length of the straight waveguide on the incident side of the optical waveguide can be made equal to or smaller than 2000 times the wavelength of a light wave to be guided, or equal to or smaller than 3 mm, so a compact optical waveguide element can be provided. Further, the branch ratio of the Y-branch waveguide can be substantially in one-to-one correspondence, so an optical waveguide element having excellent optical characteristics, such as the ON/OFF extinction ratio and the like, can be provided.

According to the method of adjusting an optical axis of an optical waveguide element according to the embodiments of the invention, in the characteristic evaluation of the optical waveguide element itself of an optical waveguide element module in which waveguide means for input/output, such as an optical fiber or the like, is connected to an optical waveguide element, the measurement method concerning the branch ratio which is used in the above-described method of adjusting an optical axis may be used.

For example, in the characteristic evaluation of the optical waveguide element, with the method of adjusting an optical axis of the first embodiment, two or more light waves having different wavelengths are input to the straight waveguide 6 of the optical waveguide element, and the light intensities of light waves emitted from the optical waveguide element are measured. In this way, the branch ratio of the Y-branch waveguide 7 can be accurately measured. Thus, the characteristic evaluation of the optical waveguide element can be made on the basis of the measurement values.

When an optical waveguide element has a Mach-Zehnder type optical waveguide, with the method of adjusting an optical axis according to the second embodiment, white input is input to the straight waveguide 24 of the optical waveguide element 23 and outgoing light from the optical waveguide element is monitored by the oscilloscope or the like. In this way, the branch ratio of the Y-branch waveguide 25 can be evaluated.

In the above description, the characteristic evaluation of the optical waveguide element itself is made, but the characteristic evaluation of an optical waveguide element module may be made in the same manner.

The method of adjusting an optical axis and the method of evaluating characteristics of an optical waveguide element according to the invention are not limited to the foregoing embodiments. For example, a white light source, such as SLD or the like, may be used as the light sources in the first embodiment, or the light source of the second embodiment may be formed by a plurality of semiconductor lasers and light sources having two or more different wavelengths may be used.

The invention provides a method of adjusting an optical axis of an optical waveguide element which can improve the manufacturing yield of the optical waveguide element or alignment yield between the optical waveguide element and the input waveguide means, and can equalize the branch ratio in the Y-branch waveguide, and an optical waveguide element which can be made compact and kept simple in structure.

The invention claimed is:

1. A method of adjusting an optical axis of an optical waveguide element in connecting input waveguide means to the optical waveguide element, the optical waveguide element having an optical waveguide formed on a substrate, the optical waveguide having at least a straight waveguide and a Y-branch waveguide branched from the straight waveguide, and the input waveguide means inputting a light wave to the optical waveguide element, the method comprising the steps of:
inputting a wide band wavelength light beam or two or more single-wavelength light beams having different wavelengths to the straight waveguide through the input waveguide means; and
adjusting optical axes of the optical waveguide element and the input waveguide means such that light waves output from respective branch arms of the Y-branch waveguide have substantially identical light intensity.

2. The method according to claim 1, wherein a length of the straight waveguide is equal to or smaller than 2000 times a wavelength of a light wave to be guided, or equal to or smaller than 3 mm.

3. A method of adjusting an optical axis of an optical waveguide element in connecting input waveguide means to the optical waveguide element, the optical waveguide element having an optical waveguide formed on a substrate, the optical waveguide having at least a straight waveguide and a Y-branch waveguide branched from the straight waveguide, and the input waveguide means inputting a light wave to the optical waveguide element, the method comprising the steps of:
inputting a wide band wavelength light beam or two or more single-wavelength light beams having different wavelengths to the straight waveguide through the input waveguide means; and
multiplexing light waves output from respective branch arms of the Y-branch waveguide and measuring at least one of light intensity and modulation characteristics of a light wave after the multiplexing so as to adjust optical axes of the optical waveguide element and the input waveguide means.

4. The method according to claim 3, wherein the optical waveguide is a nested optical waveguide formed on the substrate at least from the Y-branch waveguide to a multiplexer for multiplexing the light waves output from the respective branch arms.

5. The method according to claim 4, wherein a length of the straight waveguide is equal to or smaller than 2000 times a wavelength of a light wave to be guided, or equal to or smaller than 3 mm.

6. The method according to claim 3, wherein the optical waveguide is a Mach-Zehnder type optical waveguide formed on the substrate at least from the Y-branch waveguide to a multiplexer for multiplexing the light waves output from the respective branch arms.

7. The method according to claim 6, wherein the optical axes of the optical waveguide element and the input waveguide means are adjusted such that a variation in an ON/OFF extinction ratio of the light wave after the multiplexing is within 10 dB.

8. The method according to claim 6, wherein a length of the straight waveguide is equal to or smaller than 2000 times a wavelength of a light wave to be guided, or equal to or smaller than 3 mm.

9. The method according to claim 3, wherein the optical axes of the optical waveguide element and the input waveguide means are adjusted such that a variation in an ON/OFF extinction ratio of the light wave after the multiplexing is within 10 dB.

10. The method according to claim 9, wherein a length of the straight waveguide is equal to or smaller than 2000 times a wavelength of a light wave to be guided, or equal to or smaller than 3 mm.

11. The method according to claim 4, wherein the optical axes of the optical waveguide element and the input waveguide means are adjusted such that a variation in an ON/OFF extinction ratio of the light wave after the multiplexing is within 10 dB.

12. The method according to claim 3, wherein a length of the straight waveguide is equal to or smaller than 2000 times a wavelength of a light wave to be guided, or equal to or smaller than 3 mm.

13. An optical waveguide element comprising:
an optical waveguide formed on a substrate, the optical waveguide having at least a straight waveguide and a Y-branch waveguide branched from the straight waveguide,
wherein input waveguide means for inputting a light wave is connected to the optical waveguide element, and
when a wide band wavelength light beam or two or more single-wavelength light beams having different wavelengths are input to the straight waveguide through the input waveguide means, optical axes of the optical waveguide element and the input waveguide means are arranged such that light waves output from respective branch arms of the Y-branch waveguide have substantially identical light intensity, and a length of the straight waveguide is equal to or smaller than 2000 times a wavelength of a light wave to be guided, or equal to or smaller than 3 mm.

14. An optical waveguide element comprising:
an optical waveguide formed on a substrate, the optical waveguide having at least a straight waveguide and a Y-branch waveguide branched from the straight waveguide,
wherein input waveguide means for inputting a light wave is connected to the optical waveguide element, and
when a wide band wavelength light beam or two or more single-wavelength light beams having different wavelengths are input to the straight waveguide through the input waveguide means, light waves output from respective branch arms of the Y-branch waveguide are multiplexed and at least one of light intensity and modulation characteristics of a light wave after the multiplexing is measured so as to adjust optical axes of the optical waveguide element and the input waveguide means, and a length of the straight waveguide is equal to or smaller than 2000 times a wavelength of a light wave to be guided, or equal to or smaller than 3 mm.

15. The optical waveguide element according to claim 14, wherein the optical waveguide is a Mach-Zehnder type optical waveguide formed on the substrate at least from the Y-branch waveguide to a multiplexer for multiplexing the light waves output from the respective branch arms.

16. The optical waveguide element according to claim 15, wherein the optical axes of the optical waveguide element and the input waveguide means are adjusted such that a variation in an ON/OFF extinction ratio of the light wave after the multiplexing is within 10 dB.

17. The optical waveguide element according to claim 14, wherein the optical waveguide is a nested optical waveguide formed on the substrate at least from the Y-branch waveguide to a multiplexer for multiplexing the light waves output from the respective branch arms.

18. The optical waveguide element according to claim 14, wherein the optical axes of the optical waveguide element and the input waveguide means are adjusted such that a variation in an ON/OFF extinction ratio of the light wave after the multiplexing is within 10 dB.

19. The optical waveguide element according to claim 18, wherein the optical axes of the optical waveguide element and the input waveguide means are adjusted such that the variation in the ON/OFF extinction ratio of light waves is within 10 dB in a wavelength range of one or more of an O band, an E band, an S band, a C band, and an L band.

20. The optical waveguide element according to claim 17, wherein the optical axes of the optical waveguide element and the input waveguide means are adjusted such that a variation in an ON/OFF extinction ratio of the light wave after the multiplexing is within 10 dB.

* * * * *